United States Patent [19]

Oshidari

[11] Patent Number: 5,073,160
[45] Date of Patent: Dec. 17, 1991

[54] PLANETARY GEAR TYPE MULTISTAGE TRANSMISSION

[75] Inventor: Toshikazu Oshidari, Kanagawa, Japan

[73] Assignee: Nissan Motor Company, Ltd., Japan

[21] Appl. No.: 698,211

[22] Filed: May 10, 1991

[30] Foreign Application Priority Data

May 14, 1990 [JP] Japan .................... 2-123785

[51] Int. Cl.⁵ .............................. F16H 57/10
[52] U.S. Cl. .................................. 475/281
[58] Field of Search .................. 475/280-289

[56] References Cited

U.S. PATENT DOCUMENTS 4,872,376 10/1989 Asada et al. ............... 475/281

FOREIGN PATENT DOCUMENTS

| 305045 | 3/1989 | European Pat. Off. ............ 475/281 |
| 63-303245 | 12/1988 | Japan . |
| 63-308253 | 12/1988 | Japan .................. 475/281 |
| 1-105042 | 4/1989 | Japan .................. 475/281 |

Primary Examiner—Dwight Diehl

Attorney, Agent, or Firm—Lowe, Price, LeBlanc & Becker

[57] ABSTRACT

A planetary gear type multistage transmission is shown which comprises a first planetary gearset, a second planetary gearset, an input shaft and an output shaft. A pinion carrier of the second planetary gearset is united with a pinion carrier of the first planetary gearset. The input shaft is united with the pinion carrier of the second planetary gearset. The output shaft is united with an internal gear of the first planetary gearset. A first clutch is employed for selectively engaging the sun gear of the first planetary gearset with the pinion carrier of the same. A second clutch is employed for selectively engaging the sun gear of the first planetary gearset with the pinion carrier of the second planetary gearset. A third clutch is used for selectively engaging the pinion carrier of the second planetary gearset with the internal gear of the same. A first brake is employed for selectively braking the sun gear of the first planetary gearset. A second brake is employed for selectively braking the pinion carrier of the first planetary gearset and a third brake is employed for selectively braking the sun gear of the second planetary gearset.

10 Claims, 7 Drawing Sheets

|  | C1 | C2 | C3 | C4 | B1 | B2 | B3 | SPEED CHANGE RATIO | $\alpha_1 = 0.4$ $\alpha_2 = 0.5$ |
|---|---|---|---|---|---|---|---|---|---|
| 1'ST SPEED |  | O |  |  |  |  | O | $\dfrac{1}{-\alpha_2(\alpha_1+1)+1}$ | 3.33 |
| 2'ND SPEED | O |  |  |  |  |  | O | $\dfrac{1}{-\alpha_2+1}$ | 2.00 |
| 3'RD SPEED |  |  |  |  | O |  | O | $\dfrac{1}{(\alpha_1+1)(-\alpha_2+1)}$ | 1.43 |
| 4'TH SPEED |  |  |  | O | (O) |  |  | 1.00 | 1.00 |
| 5'TH SPEED |  |  | O |  | O |  |  | $\dfrac{1}{\alpha_1+1}$ | 0.71 |
| REVERSE |  | O |  |  |  | O |  | $-\dfrac{1}{\alpha_1}$ | -2.50 |

FIG.3
(1'ST SPEED)

FIG.4
(2'ND SPEED)

FIG.5
(3'RD SPEED)

FIG.6
(4'TH SPEED)

FIG.7
(5'TH SPEED)

FIG.8
(REVERSE)

|  | C1 | C2 | C3 | B1 | B2 | B3 | SPEED CHANGE RATIO | $\alpha_1 = 0.4$ $\alpha_2 = 0.5$ |
|---|---|---|---|---|---|---|---|---|
| 1'ST SPEED |  | O |  |  |  | O | $\dfrac{1}{-\alpha_2(\alpha_1+1)+1}$ | 3.33 |
| 2'ND SPEED | O |  |  |  |  | O | $\dfrac{1}{-\alpha_2+1}$ | 2.00 |
| 3'RD SPEED |  |  |  | O |  | O | $\dfrac{1}{(\alpha_1+1)(-\alpha_2+1)}$ | 1.43 |
| 4'TH SPEED |  | O | O | (O) |  |  | 1.00 | 1.00 |
| 5'TH SPEED |  |  | O | O |  |  | $\dfrac{1}{\alpha_1+1}$ | 0.71 |
| REVERSE |  | O |  |  | O |  | $-\dfrac{1}{\alpha_1}$ | -2.50 |

| | C1 | C2 | C3 | C4 | B1 | B2 | B3 | B4 | F1 | F2 | SPEED CHANGE RATIO |
|---|---|---|---|---|---|---|---|---|---|---|---|
| 1'ST SPEED | | ⊙ | | | | | ⊙ | ○ | ○ | ○ | $\dfrac{1}{-\alpha_2(\alpha_1+1)+1}$ |
| 2'ND SPEED | ○ | | | | | | ⊙ | ○ | ○ | | $\dfrac{1}{-\alpha_2+1}$ |
| 3'RD SPEED | | | | ○ | | | ⊙ | ○ | ○ | | $\dfrac{1}{(\alpha_1+1)(-\alpha_2+1)}$ |
| 4'TH SPEED | | | | ○ | (○) | | | | | | 1.00 |
| 5'TH SPEED | | ○ | | ○ | | | | | | | $\dfrac{1}{\alpha_1+1}$ |
| REVERSE | | ○ | | | ○ | | | | | | $-\dfrac{1}{\alpha_1}$ |

⊙ --- ENGAGED WHEN ENGINE BRAKE IS NEEDED

FIG.13
(PRIOR ART)

PLANETARY GEAR TYPE MULTISTAGE TRANSMISSION

BACKGROUND OF THE INVENTION

1. Field of the Invention

The present invention relates to a planetary gear type multistage transmission.

2. Description of the Prior Art

Japanese Patent First Provisional Publication No. 63-303245 shows a conventional planetary gear type transmission with five forward speeds, which comprises generally a single pinion type planetary gearset, a double pinion type planetary gearset, four clutches, five brakes and four one-way clutches.

However, due to its inherent construction, the transmission has the following drawbacks.

That is, when the transmission intends to achieve a speed change from first speed to second speed, a switching from one clutch to another clutch and a switching from one one-way clutch to another one-way clutch must be carried out at substantially same time. However, these switchings tend to produce undesirable shift shock for the reason which will be described in the following.

Figure 13:
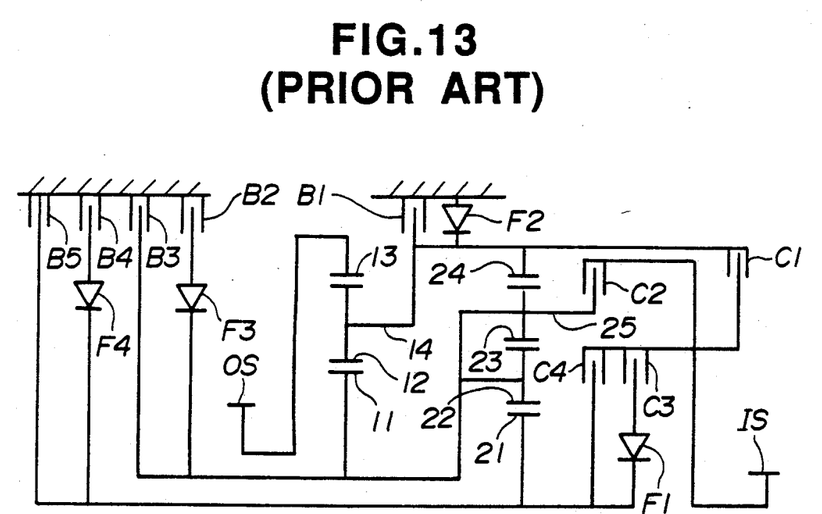
FIG. 13 is a view similar to FIG. 1, but showing a conventional planetary gear type multistage transmission.

For ease of understanding, the description will be made with reference to FIG. 13 of the attached drawings, which shows schematically the conventional transmission of the publication.

For achieving the speed change from first to second speed, four friction elements are subjected to switching operation (viz., "ON to OFF" operation or "OFF to ON" operation). That is, for achieving such speed change, disengagement (viz., "ON to OFF" operation) of second clutch C2, engagement (viz., "OFF to ON" operation) of third clutch C3, disengagement (viz., "ON to OFF" operation) of fourth one-way clutch F4 and engagement (viz., "OFF to ON" operation) of second one-way clutch F2 are necessary.

However, if the switching from the second clutch C2 to the third clutch C3 is carried out prior to that from the fourth one-way clutch F4 to the second one-way clutch F2, there is inevitably produced a temporary condition wherein parts connected to an input shaft are interlocked and parts connected to an output shaft are neutral. While, if the switching from the fourth one-way clutch F4 to the second one-way clutch F2 is carried out prior to that from the second clutch C2 to the third clutch C3, the parts of the transmission assume but temporarily a reverse condition.

As will be understood from the above, when, in the transmission of the publication, engagement and disengagement of selected two of four friction elements (viz., four in a group including the four clutches C1 to C4, the five brakes B1 to B5 and the four one-way clutches F1 to F4) are carried out prior to those of the remaining two, interlocked condition, neutral condition and reversed condition tend to occur temporarily in the transmission. As is known, these conditions cause an undesirable shift shock during the speed change.

Accordingly, in the transmission of this type, it is quite important to adjust the engaging and/or disengaging timings of the four friction elements to optimal levels. In fact, if, for achieving a desired timing in switching from the second clutch C2 to the third clutch C3, the disengaging timing of the second clutch C2 is changed, this change has effect on not only the third clutch C3 but also the other friction elements. Thus, the adjustment of the timing is quite difficult.

Although the difficulty in such timing adjustment is somewhat lightened by use of the one-way clutches F1 to F4, the timing adjustment of the one-way clutches is somewhat difficult as compared with that of the switching from one clutch to another clutch or that of switching from one brake to another brake.

Besides the above-mentioned drawbacks, the conventional transmission of the publication has further the following drawbacks.

That is, because the part's layout does not permit the transmission to have an output shaft which extends in a direction opposite to the direction in which an input shaft extends, a so-called "longitudinally mounted transmission" (viz., a transmission for "FR type" motor vehicle) is not expected from such transmission.

Furthermore, usage of the four clutches C1 to C4, the five brakes B1 to B5 and the four one-way clutches F1 to F4 induces a bulky construction of the transmission.

SUMMARY OF THE INVENTION

It is therefore an object of the present invention to provide a planetary gear type multistage transmission which is free of the above-mentioned drawbacks.

According to the present invention, there is provided a planetary gear type multistage transmission which comprises a first planetary gearset including a first sun gear, a first internal gear, first pinion gears operatively meshed with the first sun gear and the first internal gear and a first pinion carrier rotatably carrying the first pinion gears; a second planetary gearset including a second sun gear, a second internal gear, mutually engaged second and third pinion gears respectively meshed with the second sun gear and the second internal gear and a second pinion carrier rotatably carrying the second and third pipion gears, the second pinion carrier being united with the first pinion carrier; an input shaft having the second pinion carrier united therewith; an output shaft having the first internal gear united therewith; a first clutch for selectively engaging the first sun gear with the first pinion carrier; a second clutch for selectively engaging the first sun gear with the second pinion carrier; a third clutch for selectively engaging the second pinion carrier with the second internal gear; a first brake for selectively braking the first sun gear; a second brake for selectively braking the first pinion carrier; and a third brake for selectively braking the second sun gear.

BRIEF DESCRIPTION OF THE DRAWINGS

Other objects and advantages of the present invention will become apparent from the following description when taken in conjunction with the accompanying drawings, in which.

DETAILED DESCRIPTION OF THE INVENTION

Figure 1:
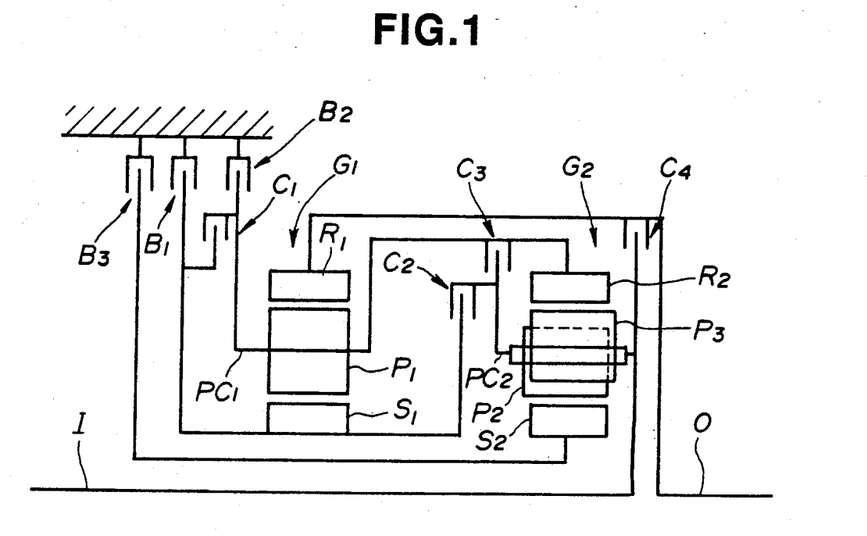
FIG. 1 is a schematic view of a planetary gear type multistage transmission of a first embodiment of the present invention.

Referring to FIGS. 1 to 8 of the drawings, particularly FIG. 1, there is shown a planetary gear type multistage transmission of a first embodiment of the present invention.

As shown in FIG. 1, the transmission of the first embodiment comprises generally a first planetary gearset G1, a second planetary gearset G2, an input shaft I, an output shaft O, a first clutch C1, a second clutch C2, a third clutch C3, a fourth clutch C4, a first brake B1, a second brake B2 and a third brake B3.

The first planetary gearset G1 includes a first sun gear S1, a first internal gear R1 and a first pinion carrier PC1 rotatably supporting first pinion gears P1. The first pinion gears P1 are meshed with both the first sun gear S1 and the first internal gear R1.

The second planetary gearset G2 includes a second sun gear S2, a second internal gear R2 and a second pinion carrier PC2 rotatably supporting both second pinion gears P2 and third pinion gears P3. Each second pinion gear P2 is meshed with the corresponding third pinion gear P3. The second pinion gears P2 are meshed with the second sun gear S2, and the third pinion gears P3 are meshed with the second internal gear R2.

The input shaft I is united with the second pinion carrier PC2, and the output shaft O is united with the first internal gear R1. The first pinion carrier PC1 is united with the second internal gear R2.

The first sun gear S1 is engageable with the first pinion carrier PC1 through the first clutch C1, and the first sun gear S1 is engageable with the second pinion carrier PC2 through the second clutch C2. The first pinion carrier PC1 is engageable with the second pinion carrier PC2 through the third clutch C3.

The input shaft I is engageable with the output shaft O through the fourth clutch C4.

The first sun gear S1 can be fixed by means of the first brake B1, the first pinion carrier PC1 can be fixed by means of the second brake B2, and the second sun gear S2 can be fixed by means of the third brake B3.

With the arrangement as mentioned hereinabove, the transmission of the first embodiment obtains five forward speeds and one reverse, as will be understood from TABLE of FIG. 2.

In TABLE, "O" means "ON" or engagement of the associated clutch or brake and "blank" means "OFF" or disengagement of the same. It is to be noted that "(O)" means an engaged condition of an associated clutch or brake (viz., the first brake B1). However, this engagement does not participate in power transmission in the associated speed (viz., the forward fourth speed). For achieving a smoothed and quick response when shifted to its before or behind speed wherein engagement is needed, such engagement "(O)" is preferable.

It is to be noted that "$\alpha 1$" is a ratio (viz., 0.4) of the number of teeth of the first sun gear S1 to that of the first internal gear R1, and "$\alpha 2$" is a ratio (viz., 0.5) of the number of teeth of the second sun gear S2 to that of the second internal gear R2.

The power paths established in various speeds are shown in FIGS. 3 to 8 respectively.

Figure 2:
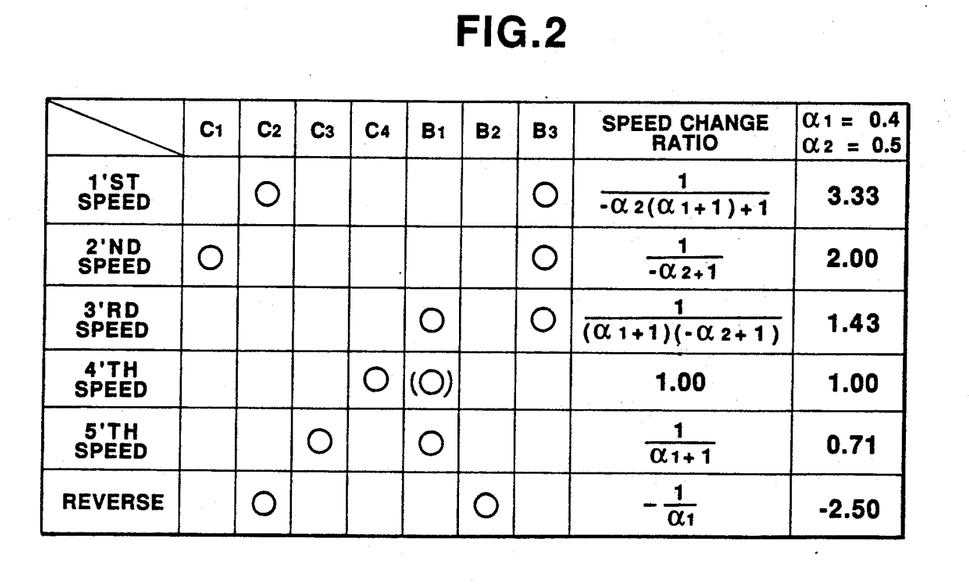
FIG. 2 is TABLE showing ON/OFF conditions of various friction elements with respect to speeds selected, which conditions are possessed by the first embodiment.
Figure 3:
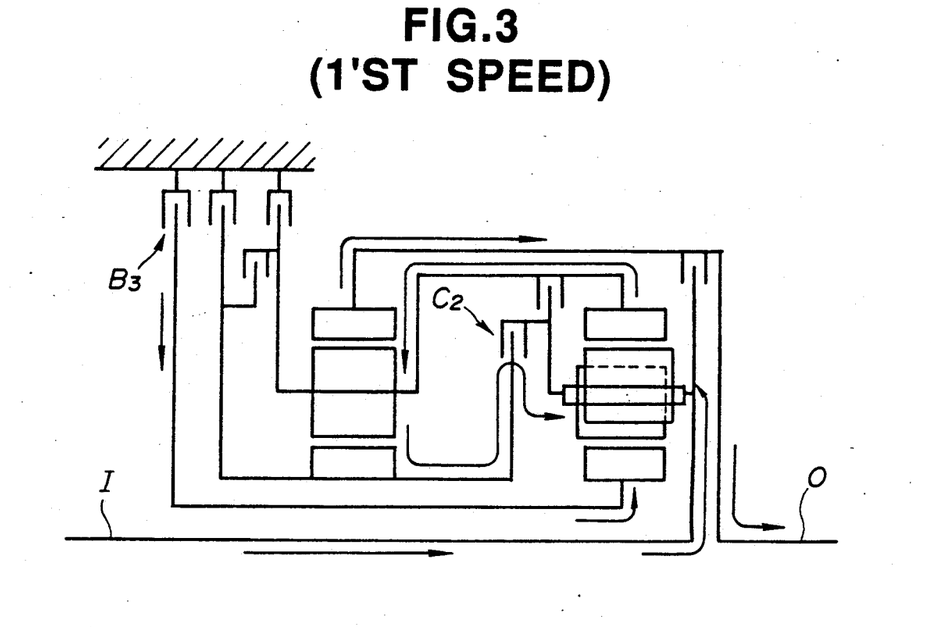
FIG. 3 is a view similar to FIG. 1, but showing the power path established when the transmission is under a first speed.
Figure 4:
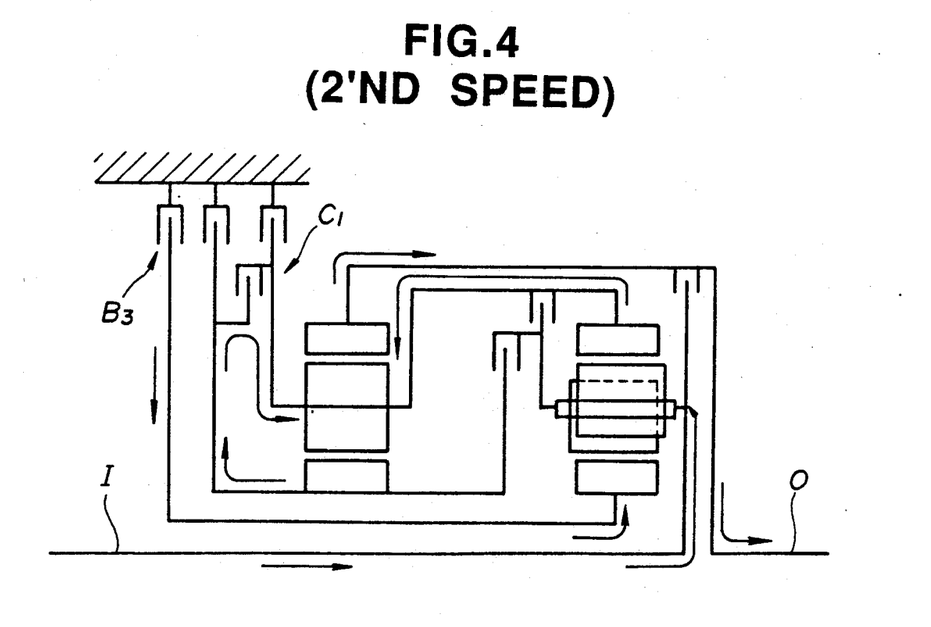
FIG. 4 is a view similar to FIG. 1, but showing the power path established when the transmission is under a second speed.
Figure 5:
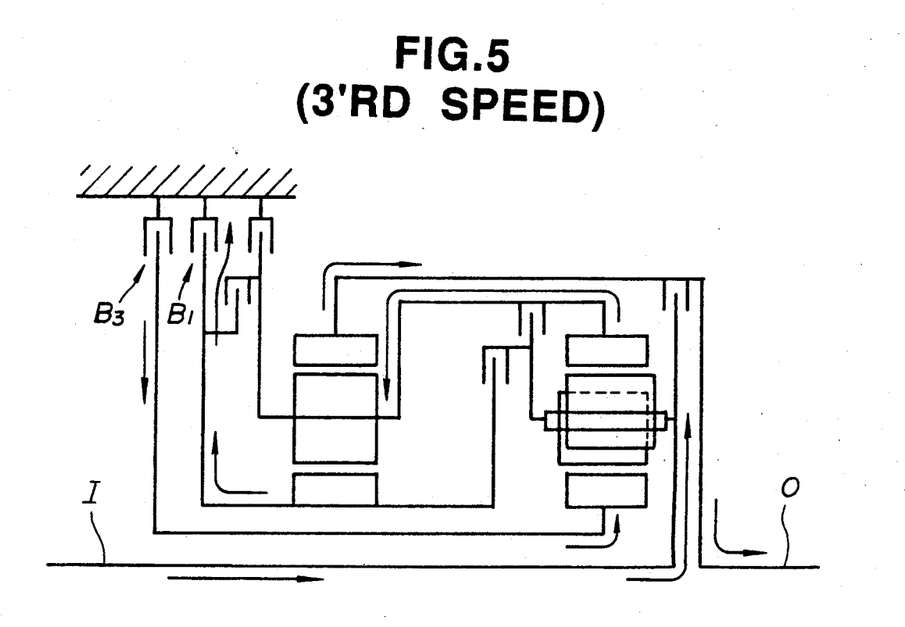
FIG. 5 is a view similar to FIG. 1, but showing the power path established when the transmission is under a third speed.
Figure 6:
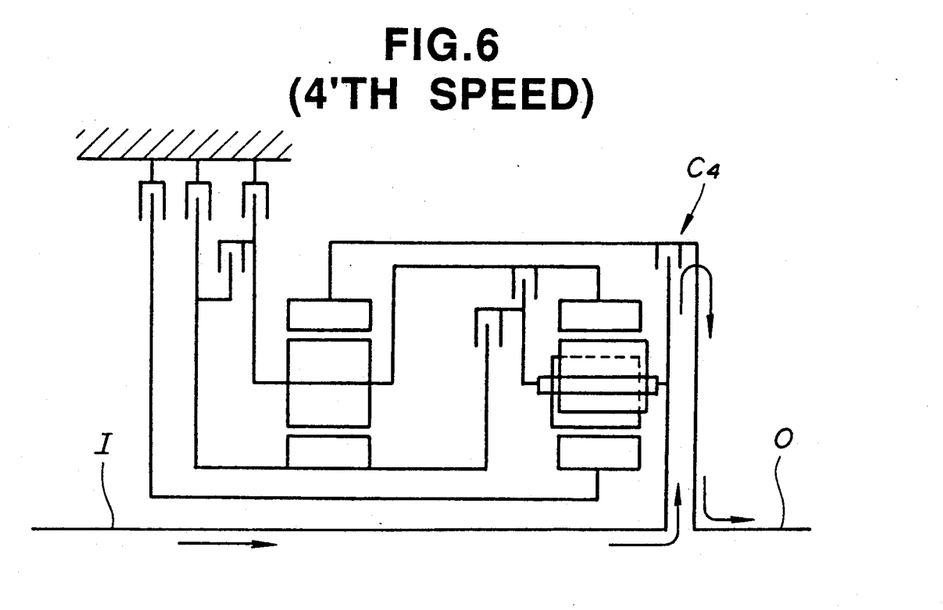
FIG. 6 is a view similar to FIG. 1, but showing the power path established when the transmission is under a fourth speed.
Figure 7:
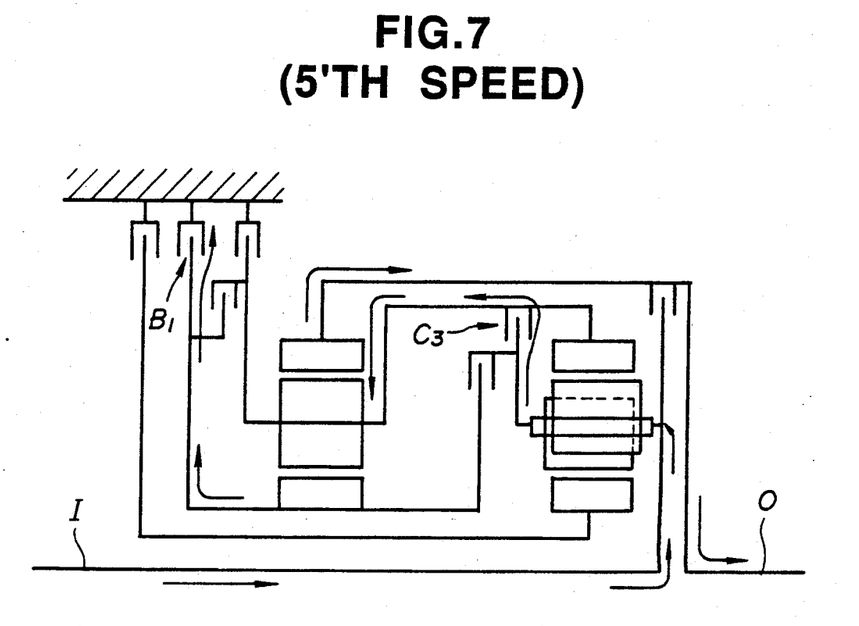
FIG. 7 is a view similar to FIG. 1, but showing the power path established when the transmission is under a fifth speed.
Figure 8:
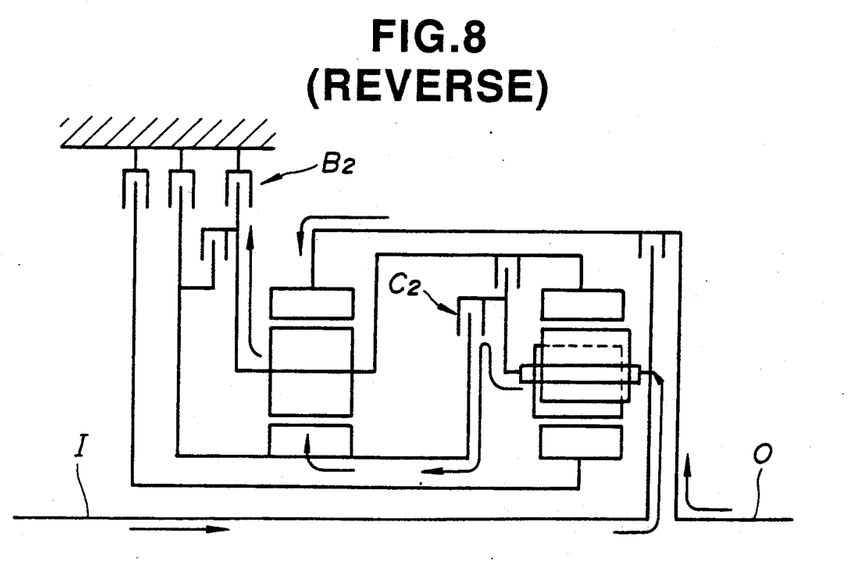
FIG. 8 is a view similar to FIG. 1, but showing the power path established when the transmission is under a reverse.

As will be understood from TABLE of the FIG. 2, for carrying out a speed change between any neighboring forward speeds, only two friction elements are subjected to switching operation (viz., "ON to OFF" operation or "OFF to ON" operation). That is, for achieving such switch, simultaneous "ON to OFF" operation and "OFF to ON" operation are carried out by two associated friction elements.

In fact, for achieving a speed change from first speed to second speed, disengagement (viz., "ON to OFF" operation) of the second clutch C2 and engagement (viz., "OFF to ON" operation) of the first clutch C1 are only necessary. It is to be noted that during this speed change, the condition of the third brake B3 is kept unchanged.

For achieving a speed change from second speed to third speed, disengagement (viz., "ON to OFF" operation) of the first clutch C1 and engagement (viz., "OFF to ON" operation) of the first brake B1 are only necessary, and for achieving a speed change from third to fourth speed, disengagement (viz., "ON to OFF" operation) of the third brake B3 and engagement (viz., "OFF to ON" operation) of the fourth clutch C4 are only necessary, and for achieving a speed change from fourth to fifth speed, disengagement (viz., "ON to OFF" operation) of the fourth clutch C4 and engagement (viz., "OFF to ON" operation) of the third clutch C3 are only necessary.

Accordingly, adjustment for the speed change timing is facilitated due to reduction in number of the friction elements which are subjected to "ON to OFF" or "OFF to ON" operation during the speed change.

As is understood from FIG. 1, the layout of parts permits the transmission to have the output shaft O which extends in a direction opposite to the direction in which the input shaft I extends. Thus, a longitudinally mounted type (viz., a transmission for "FF" type motor vehicle) is expected from the transmission of the invention. Furthermore, since the output of the transmission can be took out from the first planetary gearset G1 and the second planetary gearset G2, the transmission can be used for a "FF" type motor vehicle. Furthermore, usage of only the four clutches C1 to C4 and the three brakes B1 to B3 brings about a reduction in size of the transmission.

Figure 9:
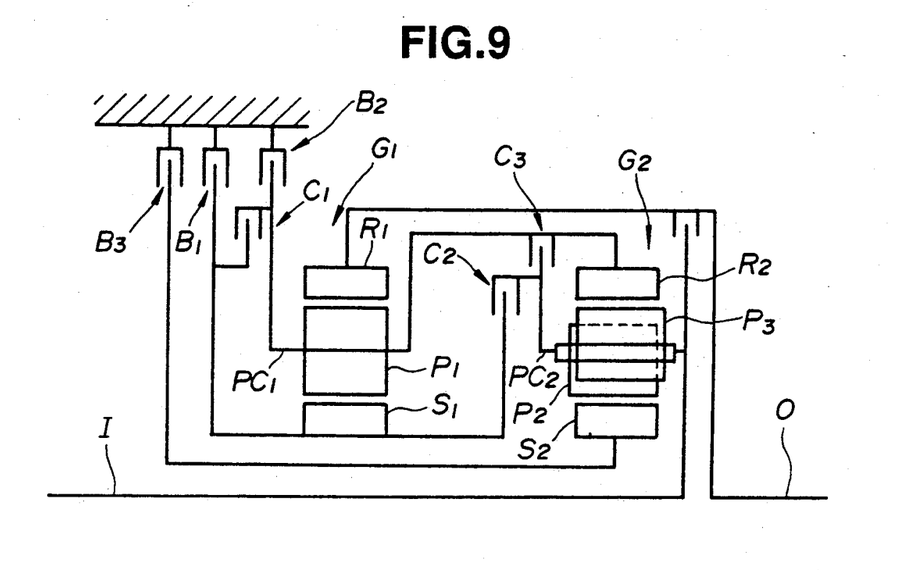
FIG. 9 is a view similar to FIG. 1, but showing a second embodiment of the present invention.
Figure 10:
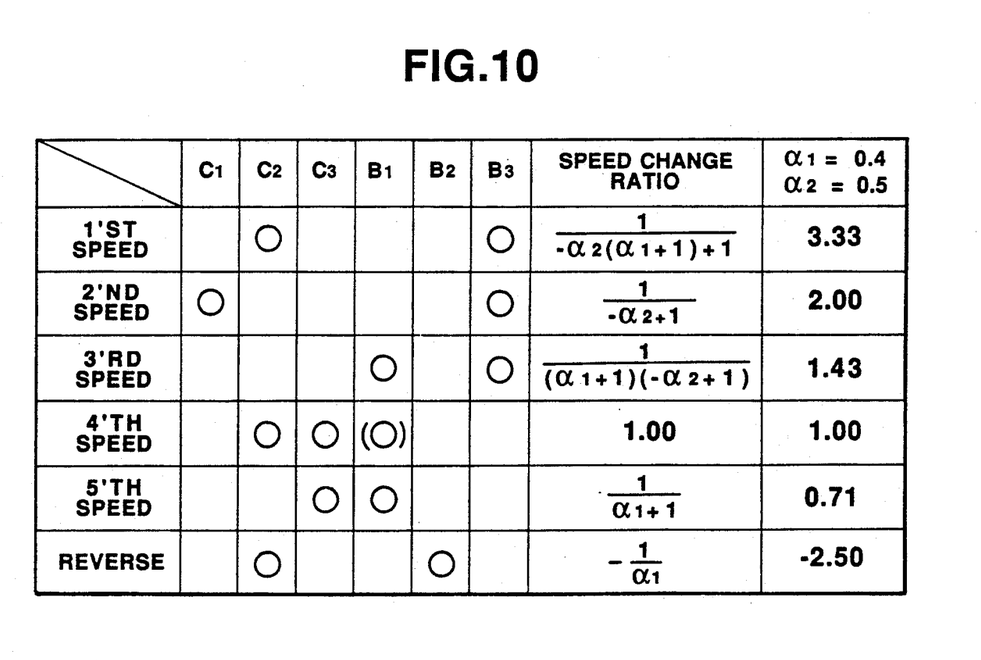
FIG. 10 is TABLE showing ON/OFF (viz., engaged/disengaged) conditions of friction elements with respect to speeds selected, which conditions are possessed by the second embodiment.

Referring to FIGS. 9 and 10, particularly FIG. 9, there is shown a transmission of a second embodiment of the present invention.

The transmission of this second embodiment is substantially the same as that of the first embodiment except one part which will be described in the following.

That is, in the second embodiment, there is no clutch which corresponds to the fourth clutch C4 employed in the first embodiment.

As is understood from TABLE of FIG. 10, in order to achieve fourth speed, both the second clutch C2 and the third clutch C3 are brought into the engaged condition respectively. That is, when these two clutches C2 and C3 are brought into the respective engaged conditions, the first and second planetary gearsets G1 and G2 become united to rotate together.

Thus, the number of the clutches used in the second embodiment is reduced by one as compared with the first embodiment.

However, in this second embodiment, for achieving a speed change between third speed and fourth speed, the switching operation is needed by three friction elements. That is, for achieving such speed change, "ON to OFF" operation or "OFF to ON" operation is needed by the second clutch C2, the third clutch C3 and the brake B3.

Figure 11:
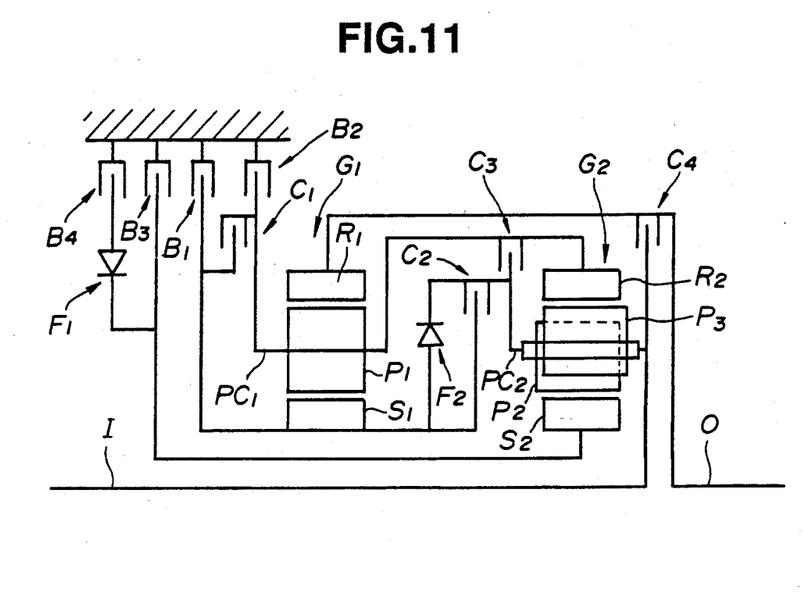
FIG. 11 is a view similar to FIG. 1, but showing a third embodiment of the present invention.
Figure 12:
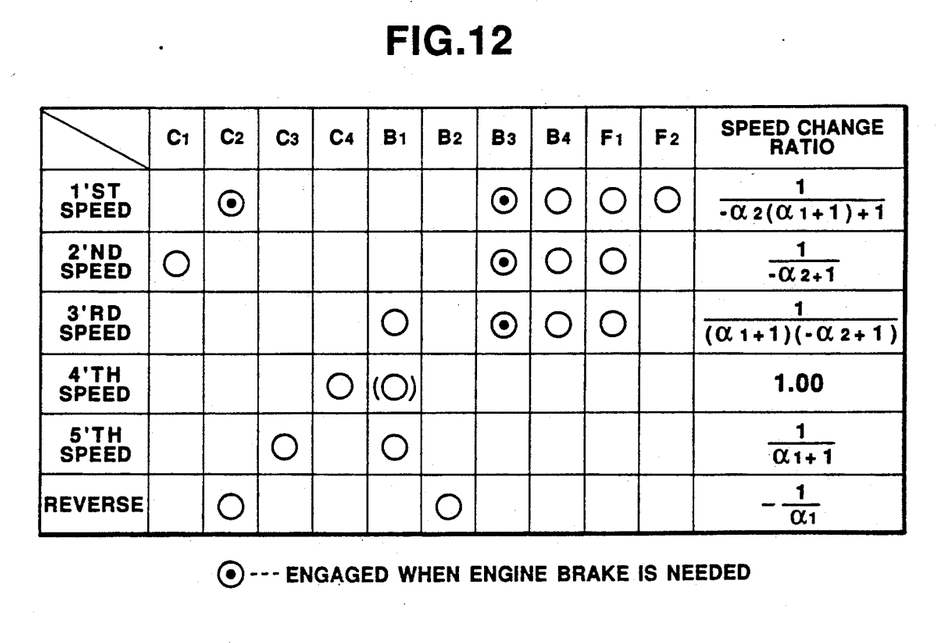
FIG. 12 is TABLE showing ON/OFF (viz., engaged/disengaged) conditions of friction elements with respect to speeds selected, which are possessed by the third embodiment.

Referring to FIGS. 11 and 12, particularly FIG. 11, there is shown a transmission of a third embodiment of the present invention.

Since the transmission of this embodiment is similar to that of the above-mentioned first embodiment, only parts and construction which are different from those of the first embodiment will be described in the following.

As is seen from FIG. 11, in the third embodiment, a first one-way clutch F1 and a fourth brake B4 are employed for permitting the second sun gear S2 to become fixed. Furthermore, a second one-way clutch F2 is disposed between the first sun gear S1 and the second pinion carrier PC2 in a manner to have a parallel relationship with the second clutch C2.

As is seen from TABLE of FIG. 12, under a condition wherein there is no need of engine brake, engagement (viz., "ON" operation) of the second clutch C2 and that (viz., "ON" operation) of the third brake B3 are unnecessary. Accordingly, adjustment for the speed change timing is much facilitated. When engine brake is necessary, engagement (viz., "OFF to ON" operation) of the second clutch C2 and that (viz., "OFF to ON" operation) of the third brake B3 are carried out.

In this third embodiments, two one-way clutches F1 and F2 are used. However, if desired, one of them may be removed. Furthermore, if desired, the fourth clutch C4 may be removed.

In the transmissions of the first, second and third embodiments, the clutches and the brakes used are all of a frictionally engaging type actuated by a hydraulic power system. However, since the second brake B2 is a member that is engaged at only the reverse, the brake B2 may be of a dog-clutch type or the like.

What is claimed is:

1. A planetary gear type multistage transmission comprising:
    a first planetary gearset including a first sun gear, a first internal gear, first pinion gears operatively meshed with said first sun gear and said first internal gear and a first pinion carrier rotatably carrying said first pinion gears;
    a second planetary gearset including a second sun gear, a second internal gear, mutually engaged second and third pinion gears respectively meshed with said second sun gear and said second internal gear and a second pinion carrier rotatably carrying said second and third pinion gears, said second pinion carrier being selectively united with said first pinion carrier;
    an input shaft having said second pinion carrier united therewith;
    an output shaft having said first internal gear united therewith;
    a first clutch for selectively engaging said first sun gear with said first pinion carrier;
    a second clutch for selectively engaging said first sun gear with said second pinion carrier;
    a third clutch for selectively engaging said second pinion carrier with said second internal gear;
    a first brake for selectively braking said first sun gear;
    a second brake for selectively braking said first pinion carrier; and
    a third brake for selectively braking said second sun gear.

2. A planetary gear type multistage transmission as claimed in claim 1, further comprising a fourth clutch for selectively engaging said input shaft with said output shaft.

3. A planetary gear type multistage transmission as claimed in claim 2, further comprising:
    a fourth brake for braking said second sun gear; and
    a first one-way clutch operatively disposed between said second sun gear and said fourth brake.

4. A planetary gear type multistage transmission as claimed in claim 3, further comprising a second one-way clutch which is operatively disposed between said first sun gear and said second pinion carrier.

5. A planetary gear type multistage transmission as claimed in claim 4, in which said second one-way clutch is arranged in parallel with said second clutch.

6. A planetary gear type multistage transmission as claimed in claim 2, further comprising control means by which any speed change effected between neighboring forward speeds is achieved by carrying out "OFF to ON" operation and "ON to OFF" operation of only two of a group including said clutches and said brakes.

7. A planetary gear type multistage transmission as claimed in claim 1, further comprising:
    a fourth brake for braking said second sun gear; and
    a first one-way clutch operatively disposed between said second sun gear and said fourth brake.

8. A planetary gear type multistage transmission as claimed in claim 7, further comprising a second one-way clutch which is operatively disposed between said first sun gear and said second pinion carrier.

9. A planetary gear type multistage transmission as claimed in claim 8, in which said second one-way clutch is arranged with parallel with said second clutch.

10. A planetary gear type multistage transmission as claimed in claim 1, further comprising control means by which at least one of the speed changes effected between neighboring forward speeds is achieved by carrying out "OFF to ON" operation and "ON to OFF" operation of only two of a group including said clutches and said brakes.

* * * * *